United States Patent
Huang

(10) Patent No.: US 11,132,269 B2
(45) Date of Patent: Sep. 28, 2021

(54) BACKUP CONTROL METHOD AND BACKUP CONTROL SYSTEM

(71) Applicant: MITAC COMPUTING TECHNOLOGY CORPORATION, Hsinchu (TW)

(72) Inventor: Yao-Wei Huang, Taoyuan (TW)

(73) Assignee: MITAC COMPUTING TECHNOLOGY CORPORATION, Hsinchu (TW)

( * ) Notice: Subject to any disclaimer, the term of this patent is extended or adjusted under 35 U.S.C. 154(b) by 154 days.

(21) Appl. No.: 16/419,997

(22) Filed: May 22, 2019

(65) Prior Publication Data
US 2020/0034253 A1 Jan. 30, 2020

(30) Foreign Application Priority Data
Jul. 25, 2018 (TW) .................................. 107125655

(51) Int. Cl.
*G06F 11/00* (2006.01)
*G06F 11/20* (2006.01)
(Continued)

(52) U.S. Cl.
CPC .......... *G06F 11/20* (2013.01); *G06F 11/3013* (2013.01); *G06F 11/326* (2013.01); *G06F 11/3495* (2013.01); *G06F 2201/86* (2013.01)

(58) Field of Classification Search
CPC .... G06F 11/20; G06F 11/3013; G06F 11/326; G06F 11/3495; G06F 11/3089;
(Continued)

(56) References Cited

U.S. PATENT DOCUMENTS 5,202,687 A * 4/1993 Distinti .................. H03M 1/02
341/158
5,822,512 A * 10/1998 Goodrum ............ G06F 11/2033
714/13
(Continued)

FOREIGN PATENT DOCUMENTS

TW        I220823      *  9/2004
TW      200511757 A       3/2005

OTHER PUBLICATIONS

Tarnoff, David, and Revised First Edition. "Computer Organization and Design Fundamentals." (2005). Chapter 1, pp. 1-16 (Year: 2005).*

(Continued)

*Primary Examiner* — Anthony J Amoroso
(74) *Attorney, Agent, or Firm* — Lewis Roca Rothgerber Christie LLP

(57) ABSTRACT

A backup control method is proposed to include: (A) two control units executing firmware such that the control units respectively operate in a master mode and a slave mode; (B) the control unit that operates in the master mode generating a health signal when executing the firmware; (C) a logic arithmetic unit determining, based on the health signal, whether the control unit that operates in the master mode functions normally; and (D) when the control unit that operates in the master mode is determined to not function normally, the logic arithmetic unit controlling a light emitting element to emit light, and notifying the control unit that operates in the slave mode such that the control unit which operates in the slave mode enters the master mode.

16 Claims, 2 Drawing Sheets

(51) Int. Cl.
*G06F 11/30* (2006.01)
*G06F 11/34* (2006.01)
*G06F 11/32* (2006.01)

(58) Field of Classification Search
CPC .. G06F 11/324; G06F 11/325; G06F 2201/86; G06F 9/3861; G06F 9/3877
See application file for complete search history.

(56) References Cited

U.S. PATENT DOCUMENTS 6,828,915 B2 * 12/2004 Gottlieb ................. G08B 29/04
340/636.12
9,842,003 B2 * 12/2017 Rao ....................... H04L 47/783

OTHER PUBLICATIONS

Search Report appended to an Office Action, which was issued to Taiwanese counterpart application No. 107125655 by the TIPO on May 29, 2019, and English Translation (2 pages).

* cited by examiner

BACKUP CONTROL METHOD AND BACKUP CONTROL SYSTEM

CROSS-REFERENCE TO RELATED APPLICATION

This application claims priority of Taiwanese Patent Application No. 107125655, filed on Jul. 25, 2018.

FIELD

The disclosure relates to backup control mechanism, and more particularly to a backup control method and a backup control system.

BACKGROUND

A conventional server system having a backup control scheme includes a backplane, a plurality of mainboards, a plurality of light emitting diodes (LEDs) disposed on the backplane, a plurality of systems on chip (SoCs) respectively disposed on the mainboards, a plurality of complex programmable logic devices (CPLDs) respectively disposed on the mainboards, and a plurality of disk drives. The LEDs are for showing operating states of the disk drives. The mainboards are paired. For each pair of the mainboards, the SoCs respectively disposed on the two mainboards of the pair are the same, and are both, for example, baseboard management controllers (BMCs), chipsets, or controllers of serial attached small computer system interface (SAS) expanders, etc.

When the conventional server system is powered up and performs its normal functions, these two SoCs respectively operate in a master mode and a slave mode. At this time, the two SoCs coordinate with each other using a predetermined protocol, such that the SoC operating in the master mode controls the CPLD disposed on the same mainboard as the SoC operating in the master mode to drive the corresponding LEDs disposed on the backplane. Thereafter, when the SoC that operates in the master mode functions abnormally or malfunctions, based on the predetermined protocol, the SoC originally operating in the slave mode would enter the master mode and control the CPLD disposed on the same mainboard as the SoC originally operating in the slave mode to drive the corresponding LEDs disposed on the backplane. However, the malfunctioning SoC is unable to notify the corresponding CPLD of the transfer of the right of control, so it is possible that the corresponding CPLD still drives the corresponding LEDs disposed on the backplane, and as a consequence, the corresponding LEDs may not correctly show the operating states of the disk drives.

SUMMARY

Therefore, an object of the disclosure is to provide a backup control method and a backup control system that can provide a notification and perform mode switching immediately.

According to an aspect of the disclosure, the backup control system is operatively associated with two light emitting elements, and includes two mainboards, two logic arithmetic units and two control units. The logic arithmetic units are respectively disposed on the mainboards, and are used to be respectively coupled to the light emitting elements. The control units are respectively disposed on the mainboards, and are each coupled to the logic arithmetic units. The control units execute firmware such that one of the control units operates in a master mode and the other one of the control units operates in a slave mode. The control unit that operates in the master mode generates a health signal when executing the firmware. One of the logic arithmetic units that is disposed on a same one of the mainboards as the control unit which operates in the master mode receives the health signal from the control unit that operates in the master mode, and determines, based on the health signal, whether the control unit that operates in the master mode functions normally. When the control unit that operates in the master mode is determined to not function normally, said one of the logic arithmetic units controls the light emitting element that is coupled thereto to emit light, and notifies the control unit that operates in the slave mode such that the control unit which operates in the slave mode enters the master mode.

According to another aspect of the disclosure, the backup control method is to be implemented using two light emitting elements, two logic arithmetic units respectively coupled to the light emitting elements, and two control units each coupled to the logic arithmetic units. The backup control method includes: (A) the control units executing firmware such that one of the control units operates in a master mode and the other one of the control units operates in a slave mode; (B) the control unit that operates in the master mode generating a health signal when executing the firmware; (C) one of the logic arithmetic units receiving the health signal from the control unit that operates in the master mode, and determining, based on the health signal, whether the control unit that operates in the master mode functions normally; and (D) when the control unit that operates in the master mode is determined to not function normally, said one of the logic arithmetic units controlling the light emitting element that is coupled thereto to emit light, and notifying the control unit that operates in the slave mode such that the control unit which operates in the slave mode enters the master mode.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
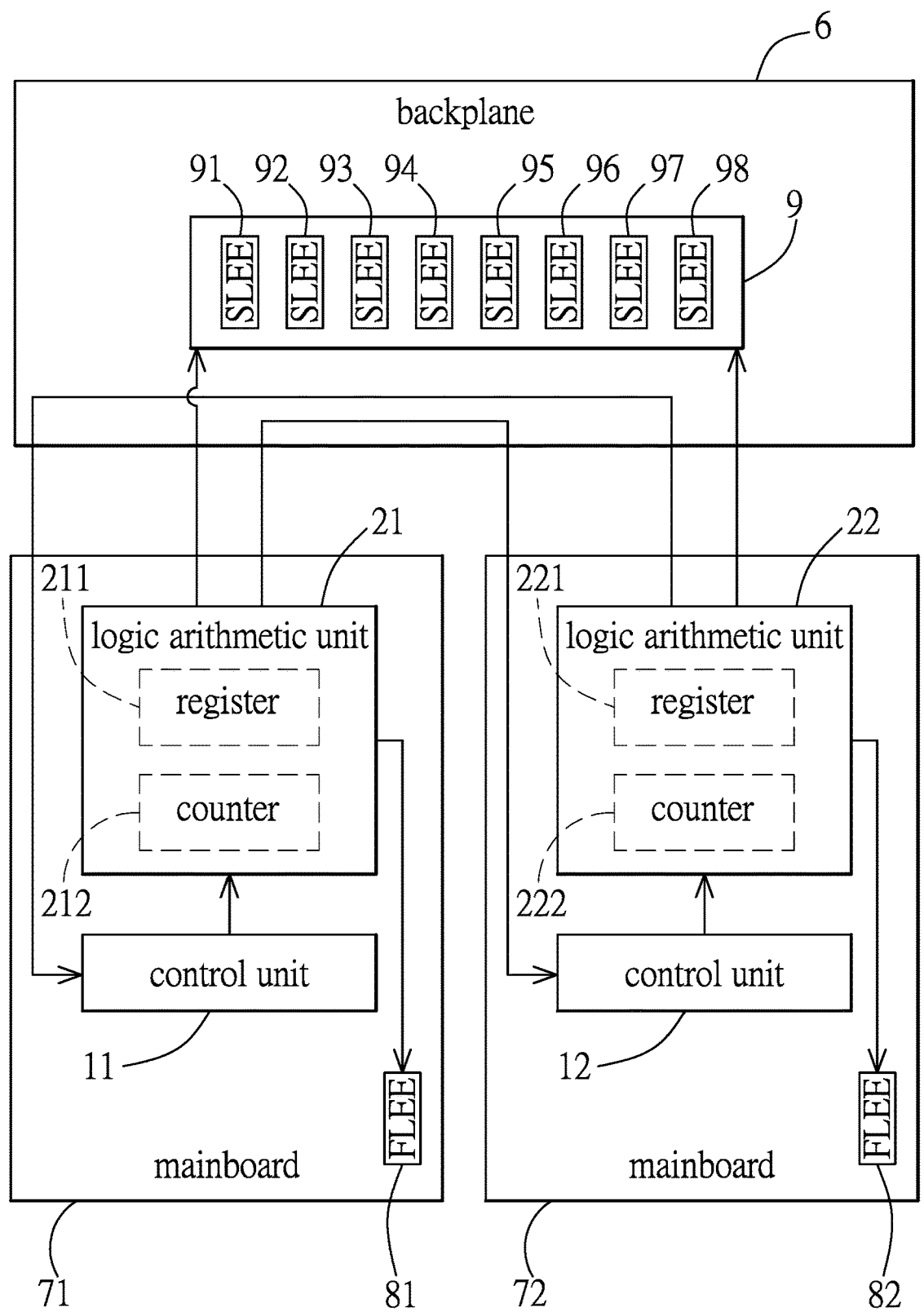
FIG. 1 is a block diagram illustrating an embodiment of a backup control system according to the disclosure.

Referring to FIG. 1, an embodiment of a backup control system according to the disclosure is used in a server system to allow the server system to have backup control mechanism, and includes a number (N) of mainboards, a number (N) of logic arithmetic units and a number (N) of control units, where N≥2. The server system at least includes a disk storage unit (not shown), a backplane 6, a number (N) of first light emitting elements (FLEE) (e.g., light emitting diodes), and a light emitting unit 9 that is disposed on the backplane 6. The first light emitting elements are respectively disposed on the mainboards or on casings (not shown) in which the mainboards are respectively disposed, and are for respectively displaying whether the control units function normally. The light emitting unit 9 includes a plurality of second light emitting elements (SLEE) 91-98 (e.g., light emitting diodes) for displaying operating states of a plurality of disk drives of the disk storage unit. In an example, two of the second light emitting elements 91-98 cooperatively display the operating state of a corresponding one of the disk drives, but the disclosure is not limited thereto. The mainboards are paired, and the two mainboards of each pair respectively operate in a master mode and a slave mode.

The backup control system of this embodiment will be described in detail below in a scenario where N=2. As such, there are two mainboards 71, 72, two logic arithmetic units 21, 22, two control units 11, 12, and two first light emitting elements 81, 82. Details of the backup control system of this embodiment in a scenario where N>2 can be inferred from the description below, and are omitted for the sake of brevity.

The logic arithmetic units 21, 22 are respectively disposed on the mainboards 71, 72, and are used to be respectively coupled to the first light emitting elements 81, 82 for respectively driving the first light emitting elements 81, 82. Each of the logic arithmetic units 21, 22 is used to be further coupled to the second light emitting elements 91-98 of the light emitting unit 9, and is operable to drive the second light emitting elements 91-98. In this embodiment, each of the logic arithmetic units 21, 22 is used to be coupled to one of the first light emitting elements 81, 82 that is disposed on the mainboard carrying the logic arithmetic unit, or that is disposed on the casing (not shown) which accommodates the mainboard carrying the logic arithmetic unit.

The control units 11, 12 are respectively disposed on the mainboards 71, 72, are each coupled to a respective one of the logic arithmetic units 21, 22 for controlling the respective one of the logic arithmetic units 21, 22 to drive the second light emitting elements 91-98. Each of the control units 11, 12 is further coupled to the other one of the logic arithmetic units 21, 22 for receiving notification from the other one of the logic arithmetic units 21, 22, as will be apparent in the following descriptions.

The control units 11, 12 are both, for example, baseboard management controllers (BMCs), central processing units (CPUs), south bridge chips, chipsets, systems on chip (SoCs), or controllers of serial attached small computer system interface (SAS) expanders. Since the second light emitting elements 91-98 of the light emitting unit 9 are used to display the operating states of the disk drives (not shown), a total number of the second light emitting elements 91-98 increases with an increasing total number of the disk drives of the disk storage unit (not shown) of the server system, and a total number of input/output pins of each of the control units 11, 12 has to increase as well in an example where each of the control units 11, 12 is used to be coupled to the second light emitting elements 91-98 for controlling the same. However, a total number of input/output pins of a baseboard management controller is limited, a total number of input/output pins of a central processing unit is limited, a total number of input/output pins of a chipset is limited, and a total number of input/output pins of a controller of a SAS expander is limited for having to comply with high speed signal transmission requirements (e.g., peripheral component interconnect express (PCIe) standard). The logic arithmetic units 21, 22 are implemented using, for example, complex programmable logic devices (CPLDs), field programmable gate arrays (FPGAs) or programmable array logics (PALs). By virtue of the logic arithmetic units 21, 22 that are respectively controlled by the control units 11, 12 to drive the second light emitting elements 91-98, each of the control units 11, 12 can control a large number of the second light emitting elements 91-98 (indirectly, i.e., through the respective logic arithmetic unit) even if the control unit has a limited number of input/output pins, as compared to the example where each of the control units 11, 12 is used to directly control the second light emitting elements 91-98.

It should be noted that, when none of the control units 11, 12 is a CPU or a BMC, one of the control units 11, 12 that operates in the master mode is for receiving a control signal from a CPU or a BMC (not shown) that is disposed on a same one of the mainboards 71, 72 as the control unit operating in the master mode, and controls the respective one of the logic arithmetic units 21, 22 based on the control signal or transmits the control signal to the respective one of the logic arithmetic units 21, 22, so the respective one of the logic arithmetic units 21, 22 is controlled by the control unit operating in the master mode to drive the second light emitting elements 91-98. That is to say, how the second light emitting elements 91-98 emit light to correctly di splay the operating states of the disk drives (not shown) is determined by the CPU or the BMC that is disposed on the same mainboard as the control unit operating in the master mode.

Figure 2:
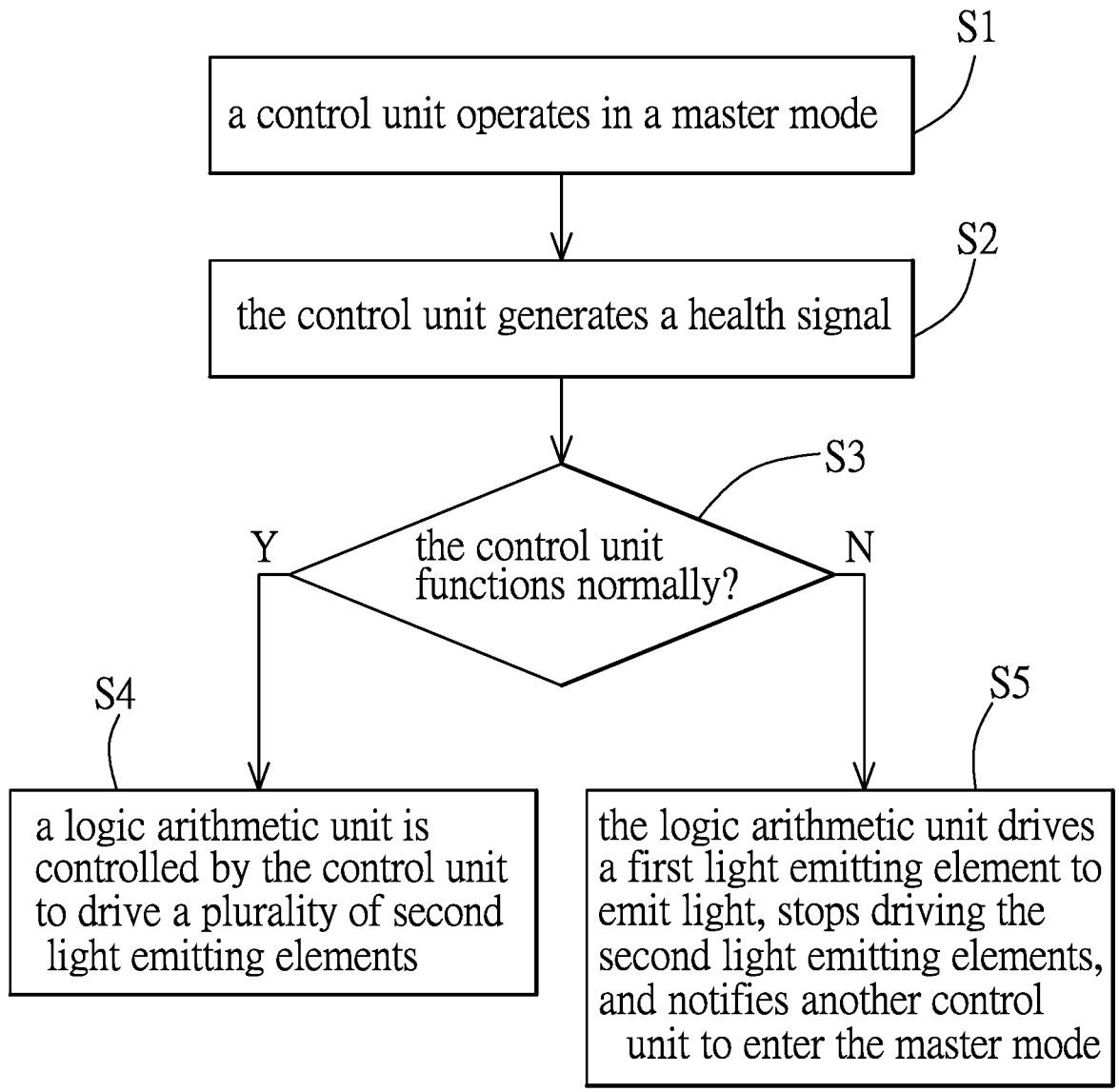
FIG. 2 is a flow chart illustrating a backup control method performed by the embodiment.

Referring to FIGS. 1 and 2, a backup control method performed by the backup control system of this embodiment includes the following steps (S1-S5).

In step (S1), the control units 11, 12 execute firmware such that one of the control units 11, 12 operates in the master mode and the other one of the control units 11, 12 operates in the slave mode. In an example, the control unit 11 operates in the master mode, and the control unit 12 operates in the slave mode. This example is used to illustrate the remaining steps (S2-S5). However, the disclosure is not limited thereto.

In step (S2), the control unit that operates in the master mode 11 generates a health signal when executing the firmware. Some implementations of the health signal are given below. In a first implementation, when the control unit that operates in the master mode 11 functions normally, the health signal is periodic, i.e., its waveform repeats regularly, and has a logic value that changes in a predetermined way in each period of the health signal (e.g., the health signal is a periodic pulse signal, and has a period of one second). In a second implementation, when the control unit that operates in the master mode 11 functions normally, the health signal has a voltage magnitude that changes every predetermined time slot in a predetermined way (e.g., the voltage magnitude alternates between a logic low voltage level and a logic high voltage level every second). Ina third implementation, when the control unit that operates in the master mode 11 functions normally, the health signal represents a digital value that changes every predetermined time slot in a predetermined way (e.g., the digital value increments every second).

In step (S3), one of the logic arithmetic units 21 that is disposed on a same one of the mainboards 71 as the control unit which operates in the master mode 11 receives the health signal from the control unit that operates in the master mode 11, and determines, based on the health signal, whether the control unit that operates in the master mode 11 functions normally.

Some examples are given below to illustrate how said one of the logic arithmetic units 21 determines, based on the health signal, whether the control unit that operates in the master mode 11 functions normally.

In a first example, any one of the first to third implementations of the health signal may be used. When the health signal changes in the predetermined way in a predetermined time interval, said one of the logic arithmetic units 21 determines that the control unit which operates in the master mode 11 functions normally in the predetermined time interval. Otherwise, said one of the logic arithmetic units 21 determines that the control unit which operates in the master mode 11 does not function normally in the predetermined time interval. The predetermined time interval is longer than or equal to the period or the predetermined time slot of the health signal. In an example, the predetermined time interval is 1.5 seconds (longer than the period or the predetermined time slot of the health signal (i.e., one second)).

In a second example, any one of the first to third implementations of the health signal may be used, and the health signal is used as a trigger. Each of the logic arithmetic units 21, 22 includes a register 211, 221. Said one of the arithmetic units 21 writes a predetermined value into the register thereof 211 in response to each predetermined change of the health signal. When the predetermined value is read by said one of the logic arithmetic units 21 from the register thereof 211 during a predetermined time interval, said one of the logic arithmetic units 21 determines that the control unit which operates in the master mode 11 functions normally in the predetermined time interval, and writes another predetermined value into the register thereof 211. Otherwise, when only said another predetermined value is read by said one of the logic arithmetic units 21 from the register thereof 211 during the predetermined time interval (i.e., said one of the logic arithmetic units 21 fails to read the predetermined value which should be written into the register 211 in response to each predetermined change of the health signal if the health signal is normal), said one of the logic arithmetic units 21 determines that the control unit which operates in the master mode 11 does not function normally in the predetermined time interval. The predetermined time interval is longer than or equal to the period or the predetermined time slot of the health signal. It should be noted that each of the predetermined value and said another predetermined value may be variable (e.g., being changed periodically, or immediately prior to being written into the register 211), or may be fixed (e.g., being determined in design phase of the backup control system of this embodiment).

In a third example, any one of the first and second implementations of the health signal may be used, and the health signal is used as a trigger. Each of the logic arithmetic units 21, 22 includes a counter 212, 222. The counter 212 of said one of the logic arithmetic units 21 provides a counting value which changes (increments or decrements) in response to each predetermined change of the health signal. When the counting value at a first time point is different from the counting value at a second time point that is prior to the first time point by a predetermined time interval, said one of the logic arithmetic units 21 determines that the control unit which operates in the master mode 11 functions normally in the predetermined time interval. Otherwise, said one of the logic arithmetic units 21 determines that the control unit which operates in the master mode 11 does not function normally in the predetermined time interval. The predetermined time interval is longer than or equal to the period or the predetermined time slot of the health signal.

In step (S4), when the control unit that operates in the master mode 11 is determined to function normally, said one of the logic arithmetic units 21 is controlled by the control unit that operates in the master mode 11 to drive the second light emitting elements 91-98.

In step (S5), when the control unit that operates in the master mode 11 is determined to not function normally, said one of the logic arithmetic units 21 controls the first light emitting element 81 that is coupled thereto to emit light for indicating the mainboard 71 on which the control unit that is determined to not function normally 11 is disposed, so a maintenance staff can quickly or easily identify the mainboard 71 on which the control unit that is determined to not function normally 11 is disposed. In addition, said one of the logic arithmetic units 21 notifies the control unit that operates in the slave mode 12 of the abnormality of the control unit that operates in the master mode 11, such that the control unit which operates in the slave mode 12 enters the master mode (i.e., the backup (substitute) control function is activated) to maintain normal functioning of the server system. Moreover, said one of the logic arithmetic units 21 stops driving the second light emitting elements 91-98, and the other one of the logic arithmetic units 22 is controlled by the control unit that has switched from the slave mode to the master mode 12 to drive the second light emitting elements 91-98. Furthermore, the control unit that has switched from the slave mode to the master mode 12 transmits a notification message via the Internet to inform a system manager that the control unit 11 is determined to not function normally, and stores a fail log related to the control unit that is determined to not function normally 11.

In view of the above, by virtue of the backup control system of this embodiment performing the backup control method, when the control unit that operates in the master mode (e.g., the control unit 11) no longer functions normally, the corresponding logic arithmetic unit (i.e., the logic arithmetic unit 21) performs the following: (a) controlling the corresponding first light emitting element (i.e., the first light emitting element 81) to emit light, so as to indicate the mainboard on which the control unit that no longer functions normally is disposed (i.e., the mainboard 71); (b) immediately notifying the control unit that operates in the slave mode (i.e., the control unit 12) to enter the master mode, so the backup control function is immediately activated; and (c) ceasing to drive the second light emitting elements 91-98. At this time, the second light emitting elements 91-98 are driven by the other logic arithmetic unit (i.e., the logic arithmetic unit 22) to correctly show the operating states of the disk drives (not shown).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A backup control system operatively associated with two first light emitting elements and a plurality of second light emitting elements, and comprising:
   two mainboards;
   two logic arithmetic units respectively disposed on said mainboards, and used to be respectively coupled to the first light emitting elements, each of said logic arithmetic units being used to be further coupled to the second light emitting elements; and two control units respectively disposed on said mainboards, and each coupled to said logic arithmetic units;

wherein said control units execute firmware such that one of said control units operates in a master mode and the other one of said control units operates in a slave mode;

wherein said control unit that operates in the master mode generates a health signal when executing the firmware;

wherein one of said logic arithmetic units that is disposed on a same one of said mainboards as said control unit which operates in the master mode receives the health signal from said control unit that operates in the master mode, and determines, based on the health signal, whether said control unit that operates in the master mode functions normally;

wherein, when said control unit that operates in the master mode is determined to not function normally, said one of said logic arithmetic units controls the first light emitting element that is coupled thereto to emit light, stops driving the second light emitting elements, and notifies said control unit that operates in the slave mode such that said control unit which operates in the slave mode enters the master mode, and the other one of said logic arithmetic units is controlled by said control unit that has switched from the slave mode to the master mode to drive the second light emitting elements; and wherein, when said control unit that operates in the master mode is determined to function normally, said one of said logic arithmetic units is controlled by said control unit that operates in the master mode to drive the second light emitting elements.

2. The backup control system of claim 1, wherein, when said control unit that operates in the master mode is determined to not function normally, said control unit that has switched from the slave mode to the master mode transmits a notification message via the Internet, and stores a fail log related to said control unit that is determined to not function normally.

3. The backup control system of claim 1, wherein, when said control unit that operates in the master mode functions normally, the health signal is periodic, and has a logic value that changes in a predetermined way in each period of the health signal.

4. The backup control system of claim 1, wherein, when said control unit that operates in the master mode functions normally, the health signal has a voltage magnitude that changes every predetermined time slot in a predetermined way.

5. The backup control system of claim 1, wherein, when said control unit that operates in the master mode functions normally, the health signal represents a digital value that changes every predetermined time slot in a predetermined way.

6. The backup control system of claim 1, wherein:
when the health signal changes in a predetermined way in a predetermined time interval, said one of said logic arithmetic units determines that said control unit which operates in the master mode functions normally in the predetermined time interval;
otherwise, said one of said logic arithmetic units determines that said control unit which operates in the master mode does not function normally in the predetermined time interval.

7. The backup control system of claim 1, wherein:
said one of said logic arithmetic units includes a register, and writes a predetermined value into said register in response to each predetermined change of the health signal;
when the predetermined value is read by said one of said logic arithmetic units from said register during a predetermined time interval, said one of said logic arithmetic units determines that said control unit which operates in the master mode functions normally in the predetermined time interval, and writes another predetermined value into said register;
otherwise, said one of said logic arithmetic units determines that said control unit which operates in the master mode does not function normally in the predetermined time interval.

8. The backup control system of claim 1, wherein:
said one of said logic arithmetic units includes a counter that provides a counting value which changes in response to each predetermined change of the health signal;
when the counting value at a first time point is different from the counting value at a second time point that is prior to the first time point by a predetermined time interval, said one of said logic arithmetic units determines that said control unit which operates in the master mode functions normally in the predetermined time interval;
otherwise, said one of said logic arithmetic units determines that said control unit which operates in the master mode does not function normally in the predetermined time interval.

9. A backup control method to be implemented using two first light emitting elements, two logic arithmetic units respectively coupled to the first light emitting elements, two control units each coupled to the logic arithmetic units, and a plurality of second light emitting elements coupled to each of the logic arithmetic units, said backup control method comprising:
(A) the control units executing firmware such that one of the control units operates in a master mode and the other one of the control units operates in a slave mode;
(B) the control unit that operates in the master mode generating a health signal when executing the firmware;
(C) one of the logic arithmetic units receiving the health signal from the control unit that operates in the master mode, and determining, based on the health signal, whether the control unit that operates in the master mode functions normally;
(D) when the control unit that operates in the master mode is determined to not function normally, said one of the logic arithmetic units controlling the first light emitting element that is coupled thereto to emit light, ceasing to drive the second light emitting elements, and notifying the control unit that operates in the slave mode such that the control unit which operates in the slave mode enters the master mode, and the other one of the logic arithmetic units being controlled by the control unit that has switched from the slave mode to the master mode to drive the second light emitting elements; and
(E) when the control unit that operates in the master mode is determined to function normally, said one of the logic arithmetic units being controlled by the control unit that operates in the master mode to drive the second light emitting elements.

10. The backup control method of claim 9, wherein step (D) further including, when the control unit that operates in the master mode is determined to not function normally:
  the control unit that has switched from the slave mode to the master mode transmitting a notification message via the Internet, and storing a fail log related to the control unit that is determined to not function normally.

11. The backup control method of claim 9, wherein, in step (B), when the control unit that operates in the master mode functions normally, the health signal is periodic, and has a logic value that changes in a predetermined way in each period of the health signal.

12. The backup control method of claim 9, wherein, in step (B), when the control unit that operates in the master mode functions normally, the health signal has a voltage magnitude that changes every predetermined time slot in a predetermined way.

13. The backup control method of claim 9, wherein, in step (B), when the control unit that operates in the master mode functions normally, the health signal represents a digital value that changes every predetermined time slot in a predetermined way.

14. The backup control method of claim 9, wherein, in step (C):
  when the health signal changes in a predetermined way in a predetermined time interval, said one of the logic arithmetic units determines that the control unit which operates in the master mode functions normally in the predetermined time interval;
  otherwise, said one of the logic arithmetic units determines that the control unit which operates in the master mode does not function normally in the predetermined time interval.

15. The backup control method of claim 9, said one of the logic arithmetic units including a register, wherein, in step (C):
  said one of the logic arithmetic units writes a predetermined value into the register in response to each predetermined change of the health signal;
  when the predetermined value is read by said one of the logic arithmetic units from the register during a predetermined time interval, said one of the logic arithmetic units determines that the control unit which operates in the master mode functions normally in the predetermined time interval, and writes another predetermined value into the register;
  otherwise, said one of the logic arithmetic units determines that the control unit which operates in the master mode does not function normally in the predetermined time interval.

16. The backup control method of claim 9, wherein, in step (C):
  said one of the logic arithmetic units provides a counting value that changes in response to each predetermined change of the health signal;
  when the counting value at a first time point is different from the counting value at a second time point that is prior to the first time point by a predetermined time interval, said one of the logic arithmetic units determines that the control unit which operates in the master mode functions normally in the predetermined time interval;
  otherwise, said one of the logic arithmetic units determines that the control unit which operates in the master mode does not function normally in the predetermined time interval.

* * * * *